US012680926B2

(12) United States Patent
Zhang et al.

(10) Patent No.: US 12,680,926 B2
(45) Date of Patent: Jul. 14, 2026

(54) ULTRA-LARGE BOTTOM OPENING AND CLOSING TYPE THREE-DIMENSIONAL LOADING APPARATUS AND TEST METHOD

(71) Applicant: Northeastern University, Shenyang City (CN)

(72) Inventors: Xiwei Zhang, Shenyang City (CN); Xiating Feng, Shenyang City (CN); Qinghe Zhu, Shenyang City (CN); Lei Shi, Shenyang City (CN)

(73) Assignee: NORTHEASTERN UNIVERSITY, Shenyang City (CN)

( * ) Notice: Subject to any disclaimer, the term of this patent is extended or adjusted under 35 U.S.C. 154(b) by 288 days.

(21) Appl. No.: 18/706,093

(22) PCT Filed: Mar. 4, 2024

(86) PCT No.: PCT/CN2024/079906
§ 371 (c)(1),
(2) Date: Apr. 30, 2024

(87) PCT Pub. No.: WO2025/175600
PCT Pub. Date: Aug. 28, 2025

(65) Prior Publication Data
US 2026/0160654 A1 Jun. 11, 2026

(30) Foreign Application Priority Data
Feb. 23, 2024 (CN) .......................... 202410199383.3

(51) Int. Cl.
*G01N 3/02* (2006.01)
*G01N 3/12* (2006.01)
(52) U.S. Cl.
CPC ................. *G01N 3/02* (2013.01); *G01N 3/12* (2013.01)

(58) Field of Classification Search
CPC ....................................................... G01N 3/02
(Continued)

(56) References Cited

U.S. PATENT DOCUMENTS 11,016,010 B1 5/2021 Li et al.
2025/0086333 A1* 3/2025 Zhang .................... G06F 30/13

FOREIGN PATENT DOCUMENTS

CN 105424483 A 3/2016
CN 106840892 A 6/2017
(Continued)

*Primary Examiner* — Walter L Lindsay, Jr.
*Assistant Examiner* — Philip T Fadul
(74) *Attorney, Agent, or Firm* — MUNCY, GEISSLER, OLDS & LOWE, P.C.

(57) ABSTRACT

Provided are an ultra-large bottom opening and closing type three-dimensional loading apparatus and a test method. The apparatus comprises a horizontal reaction frame, a vertical reaction frame, a sample bearing lifting walking beam, lifting cylinders, a reaction support pad beam, array type actuator groups, and a linear array dynamic actuator group. The vertical reaction frame adopts a pre-stressed assembly structure, and the horizontal reaction frame adopts a longitudinal multi-group single-beam circumferential T-shaped scarfed high-strength pre-stressed steel wire winding assembly structure, which meets a high stiffness design requirement of a three-dimensional loading apparatus. The vertical reaction frame cooperates with the sample bearing lifting walking beam, and combines with the reaction support pad beam during test to directly bear test loads, thereby ensuring stability and operational accuracy of equipment during a loading test, and avoiding a lifting risk caused by asynchronous positions of the lifting cylinders.

9 Claims, 6 Drawing Sheets

(58) Field of Classification Search
USPC ............................................................ 73/37
See application file for complete search history.

(56)                          References Cited

FOREIGN PATENT DOCUMENTS

| | | | |
|---|---|---|---|
| CN | 107202707 | A | 9/2017 |
| CN | 115372152 | A | 11/2022 |
| CN | 116046552 | A | 5/2023 |
| CN | 116413138 | A | 7/2023 |

* cited by examiner

ULTRA-LARGE BOTTOM OPENING AND CLOSING TYPE THREE-DIMENSIONAL LOADING APPARATUS AND TEST METHOD

BACKGROUND OF THE INVENTION

1. Field of the Invention

The present invention relates to the technical field of three-dimensional physical model tests of similar materials in deep engineering, and in particular relates to an ultra-large bottom opening and closing type three-dimensional loading apparatus and a test method.

2. The Prior Arts

Deep engineering mainly includes mining engineering, tunnel engineering, water conservancy and hydropower engineering, underground laboratories, geothermal and oil and gas development engineering, continental deep drilling engineering, etc. An object or engineering carrier of deep engineering is a rock mass, which bears ground stress in three different directions ($\sigma_1 > \sigma_2 > \sigma_3 > 0$, where $\sigma_1$, $\sigma_2$ and $\sigma_3$ are major principal stress, medium principal stress, and small principal stress, respectively) under the action of a gravity field and a tectonic stress field. The deep engineering is a course of transforming rock mass excavation into specific engineering forms. Excavation breaks an original stress balance state, causing sharp changes in magnitude and direction of ground stress at different positions of the engineering rock mass. This is a main cause of frequent disasters in the deep engineering. Currently, a disaster mechanism and an engineering stability control principle of deep engineering under unequal stress fields in three different directions are still in a preliminary understanding stage.

One of the most effective methods for deep engineering disaster research is to use large-scale physical model experiments to reproduce the disaster course under three-dimensional geostress conditions. Therefore, considering properties of a geological structure, it is necessary to design an ultra-large three-dimensional loading apparatus for meter scale dimensions. The apparatus needs to have three-way load output capacity of tens of thousands of tons, and a loading object (similar material body) is in a three-dimensional six-sided closed force structural force system. The relevant apparatus with approximate reference value is a hydraulic press of tens of thousands of tons, but the hydraulic press of tens of thousands of tons is mainly aimed at metal forging, and its loading has one-dimensional characteristics. The metal sample is in a visible open state and entry and exit of the sample are in a horizontal direction, and the course of a forging process is completely different from that of a geological simulation process. High-ground stress properties of deep rock engineering require three-dimensional stress loading, which involves stress gradient control and full coverage of a sample area. Especially in the event of disasters such as rock bursts, the three-dimensional loading apparatus needs to quickly release pressure and activate damping protection. It can be seen that compared to process requirements of the ultra-large three-dimensional loading apparatus for rock engineering disaster simulation, the hydraulic press of tens of thousands of tons has little reference value. Therefore, it is necessary to develop a loading device that facilitates entering and exiting of a large-sized physical model sample (5 m level and above), has a three-direction six-sided closed loading apparatus with a relatively simple structure, and the test method.

A main characteristic of a conventional three-dimensional physical simulation apparatus for rock engineering and geotechnical engineering lies in that the loading tonnage is generally not high, and only boundary stress can be easily applied. The sample is vibrated and poured inside the loading apparatus, and a reaction loading unit in a certain direction is mechanically closed or sealed (such as using a method of disassembling bolts) to form a sealed type three-dimensional reaction loading structure.

Chinese patent application No. 202210820592.6 has published "Large-scale three-dimensional physical simulation test system for entire course of deep engineering rock burst incubation", Chinese patent application No. 202310058018.6 has published "Large-scale deep engineering disaster physical simulation facility", and Chinese patent application No. 202310058789.5 has published "Three-dimensional loading structure for ultra-large deep engineering disaster physical simulation facility". These physical model loading apparatuses of similar materials have increased the size of physical model samples from 1 m to 5 m, achieving simulation of various engineering activities in complex geological structures and occurrence environments.

Chinese patent application No. 202310058789.5 discloses "Three-dimensional loading structure for ultra-large deep engineering disaster physical simulation facility", the physical model sample adopts an upper feeding manner, and after crossing an annular beam, a bearing platform needs to first be lifted to a model sample and then lowered to a bottom testing station. Although it is feasible, it has multiple automated operation steps, high positioning accuracy requirements, and complex hydraulic system support structures.

Furthermore, Chinese patent application No. 201710432131.0 discloses "Large-scale quasi-static testing apparatus and method for soil underground structures", which relates to a three-dimensional loading test apparatus for large-sized soil samples. The soil samples are compacted inside the test apparatus, and then a reaction metal frame unit at an upper part of the test apparatus is sealed to form a sealed force system.

The test process for the large-sized physical model samples should be as concise as possible, and mounting and disassembly should be automated as much as possible. The direction of simplification, automation, and precision in achieving entering and exiting of the physical model samples into the three-dimensional loading apparatus has always been the first consideration for developers. Besides, a manner in which the large-sized physical model samples enter and exit the test apparatus can also have a significant impact on the three-dimensional loading structure of the test apparatus, which is a factor that must be balanced in the structural design of the test apparatus.

SUMMARY OF THE INVENTION

In response to problems existing in the prior art, the present invention provides an ultra-large bottom opening and closing type three-dimensional loading apparatus and a test method, which are suitable for automatic entering and exiting of physical model samples of 5 m level and larger, can achieve ultra-high stiffness and high reliability of a loading frame, and facilitate entering and exiting of the physical model samples. The ultra-large bottom opening and closing type three-dimensional loading apparatus consists of a horizontal reaction frame, a vertical reaction frame, a sample loading lifting mechanism, a reaction support pad beam, etc. During tests, a test reaction force is directly borne, thereby ensuring stability and operation accuracy of equipment under ultra-high load and long-term loading. Lifting for mounting and disassembly of the physical model samples are completed by a bearing lifting walking beam under the action of a hydraulic servo control lifting cylinder, the lifting beam serves as both entering and exiting platforms for the ultra-large physical model samples and a lifting platform for maintenance and disassembly of the actuators. The hydraulic servo control lifting cylinder has redundant design and high synchronous lifting accuracy, avoiding lifting safety risks caused by inconsistent actions of the lifting cylinder. In a physical simulation test of deep engineering disasters, a buffering damping technology for an ultra-large three-beam four-column pre-stressed loading frame is provided for the problem that the ultra-large physical model sample impacts test reliability of the loading frame during instantaneous failure. By setting back pressure of the lifting cylinder, the effect of the buffering cylinder can be achieved by the ultra-large physical model sample during the instantaneous failure, impact energy is rapidly absorbed within a short time, and the reliability of a test course, and the integrity and continuity of the test data are guaranteed.

In order to realize the above objective, the present invention adopts the following technical solution, the ultra-large bottom opening and closing type three-dimensional loading apparatus includes: a horizontal reaction frame, a vertical reaction frame, a sample bearing lifting walking beam, lifting cylinders, a reaction support pad beam, array type actuator groups, and a linear array dynamic actuator group, where the horizontal reaction frame adopts a ring scarf structure, and is mounted on four high-strength reinforced concrete support piers; a height of each high-strength reinforced concrete support pier is higher than that of an ultra-large physical model sample, and a bottom of the high-strength reinforced concrete support pier is the same in elevation as a ground floor; a vertical central axis of the vertical reaction frame coincides with that of the horizontal reaction frame, a lower end of the vertical reaction frame is locally located in a foundation pit, and the lower end of the vertical reaction frame is fixed to a bottom of the foundation pit through anchor bolts; the sample bearing lifting walking beam is mounted at a middle of the vertical reaction frame and located below a lower surface of the horizontal reaction frame; the sample bearing lifting walking beam is connected to four corners at a top of the vertical reaction frame through four lifting cylinders; one array type actuator group is arranged on a lower surface of the top of the vertical reaction frame; four array type actuator groups are uniformly distributed on an inner side of the horizontal reaction frame along a circumference direction; a through type actuator is arranged in one of the four array type actuator groups, and a robot excavation entering and exiting channel is disposed in the horizontal reaction frame directly opposite to a through hole of the through type actuator; one linear array dynamic actuator group is arranged at an upper part of the sample bearing lifting walking beam; and an entering and exiting opening for the ultra-large physical model sample and an entering and exiting opening for the reaction support pad beam are respectively formed in a crotch part between the high-strength reinforced concrete support piers below the horizontal reaction frame.

The horizontal reaction frame adopts a longitudinal multi-group single-beam circumferential T-shaped scarf assembly structure, and includes fan-shaped beams, fan-shaped perforated beams, arc-shaped support beams, and frame bearing bases; four fan-shaped perforated beams are uniformly distributed along the circumference direction of the horizontal reaction frame, the fan-shaped beams are scarfed between two adjacent fan-shaped perforated beams to form a ring assembly body, and a double-layer steel wire winding layer is arranged on an outer side of the ring assembly body; scarf contact surfaces of the fan-shaped beams and the fan-shaped perforated beams all adopt a T-shaped engaging self-limiting structure; a lifting cylinder through hole is formed in each fan-shaped perforated beam, the frame bearing base is fixedly arranged below each fan-shaped perforated beam, and the frame bearing base is connected to the high-strength reinforced concrete support pier through a high-bearing shock absorber; the four arc-shaped support beams are uniformly distributed on an inner side of the ring assembly body, an outer side arc surface of each arc-shaped support beam is in contact with an inner side arc surface of the ring assembly body, and the array type actuator group is arranged on an inner side plane of the arc-shaped support beam; and the robot excavation entering and exiting channel is located on one fan-shaped beam and the arc-shaped support beam directly opposite to the fan-shaped beam.

The vertical reaction frame includes a top beam, a bottom beam, hollow stand columns, and pre-stressed tension rods, where the pre-stressed tension rod adopts an integral forging structure; the top beam adopts a rectangular structure, and adapter ears of cylinder barrels of the lifting cylinders are arranged at four corners of the top beam; ends of the cylinder barrels of the lifting cylinders are fixedly connected to the adapter ears of the cylinder barrels of the lifting cylinders; the bottom beam adopts a rectangular structure, and is located directly below the top beam; four hollow stand columns are arranged between four corners of the bottom beam and the four corners of the top beam, and one pre-stressed tension rod is mounted in each hollow stand column; a top end of the pre-stressed tension rod is fixed to the top beam through a nut, and a bottom end of the pre-stressed tension rod is fixed to the bottom beam through a nut; and the array type actuator group is arranged on a lower surface of the top beam.

The sample bearing lifting walking beam adopts a rectangular structure, and adapter ears of cylinder rods of the lifting cylinders are arranged at four corners of the sample bearing lifting walking beam; ends of the cylinder rods of the lifting cylinders are fixedly connected to the adapter ears of the cylinder rods of the lifting cylinders; a hollow stand column through guide hole is formed in an inner side of each adapter ear of the cylinder rod of the lifting cylinder, and the hollow stand column penetrates through the hollow stand column through guide hole; an actuator mounting groove is formed in a middle of the sample bearing lifting walking beam, the linear array dynamic actuator group is arranged in the actuator mounting groove, and a single actuator in the linear array dynamic actuator group adopts a dynamic disturbance hydraulic actuator; a friction reducing support roller group is arranged on an upper surface of the sample bearing lifting walking beam; when the sample bearing lifting walking beam is located on the bottom beam of the vertical reaction frame, the ultra-large physical model sample is delivered to the sample bearing lifting walking beam in a manner of horizontal push-pull rigid chain through a heavy-load RGV track flatcar; and after the sample bearing lifting walking beam bears the ultra-large physical model sample, the sample bearing lifting walking beam is lifted to a sample loading station in a center of the horizontal reaction frame by the four lifting cylinders, to complete opening and closing type action of the three-dimensional loading apparatus for the ultra-large physical model sample.

The lifting cylinder adopts a proportional closed-loop displacement control technology, and a high-precision displacement sensor is arranged between the cylinder rod and the cylinder barrel of each lifting cylinder; a hydraulic chamber inside the lifting cylinder is connected to an accumulator through a throttle valve and an overflow valve sequentially; and an anti-falling locking device is mounted between the hollow stand column and the sample bearing lifting walking beam, and includes an anti-falling high-strength rack and an anti-falling locking cylinder, the anti-falling high-strength rack is vertically and fixedly arranged on an outer surface of the hollow stand column, the anti-falling locking cylinder is horizontally and fixedly arranged on the sample bearing lifting walking beam, an anti-falling pad is mounted at an end of a cylinder rod of the anti-falling locking cylinder, and the anti-falling pad and the anti-falling high-strength rack are in engaged and locked cooperation.

A reaction support pad beam entering and exiting tunnel is arranged on a ground of an outer side of the entering and exiting opening for the reaction support pad beam in the high-strength reinforced concrete support pier, a heavy-load track is arranged in the reaction support pad beam entering and exiting tunnel, and an upper surface of the heavy-load track is flush with an upper surface of the bottom beam of the vertical reaction frame; and the reaction support pad beam adopts a servo motor as a driving actuator.

The heavy-load RGV track flatcar is arranged on a ground of an outer side of the entering and exiting opening for the ultra-large physical model sample in the high-strength reinforced concrete support pier, the ultra-large physical model sample proceeds with a station conversion through the heavy-load RGV track flatcar, the heavy-load RGV track flatcar adopts a low-voltage track power supply mode, and the heavy-load RGV track flatcar adopts the manner of horizontal push-pull rigid chain to move the ultra-large physical model sample; when the sample bearing lifting walking beam is located in a lower limit position, an upper surface of the heavy-load RGV track flatcar is flush with the upper surface of the sample bearing lifting walking beam; and a friction reducing support roller group is arranged on the upper surface of the heavy-load RGV track flatcar.

A health monitoring sensor system is arranged on the vertical reaction frame, the horizontal reaction frame, and the lifting cylinders, and includes composite deformation sensors and displacement-pressure-temperature sensors; the composite deformation sensors are respectively arranged at an upper end, a middle, and a lower end of each pre-stressed tension rod, and twelve composite deformation sensors in total are arranged on the four pre-stressed tension rods; the composite deformation sensors are respectively arranged at an upper end, a middle, and the a lower end of an outer side of each hollow stand column, and twelve composite deformation sensors in total are arranged on the four hollow stand columns; the composite deformation sensors are respectively arranged on an inner side of the fan-shaped beams and the fan-shaped perforated beams of the horizontal reaction frame, as well as an upper end and a lower end of the scarf contact surfaces, and thirty-two composite deformation sensors in total are arranged on the horizontal reaction frame; stress-strain information, vibration information, and position information of the ultra-large bottom opening and closing type three-dimensional loading apparatus in testing operation are monitored by using the composite deformation sensors; and the displacement-pressure-temperature sensor is mounted on the lifting cylinder to monitor operating posture and stability of the lifting cylinder.

A test method adopting the ultra-large bottom opening and closing type three-dimensional loading apparatus includes the following steps.

Step I: starting the four lifting cylinders synchronously, to enable the cylinder rods of the four lifting cylinders to extend downwards synchronously to drive the sample bearing lifting walking beam to descend at a uniform speed, and monitoring the operating posture and stability of a piston of the lifting cylinders and the sample bearing lifting walking beam in real time by the composite deformation sensors and the displacement-pressure-temperature sensors, until the sample bearing lifting walking beam falls to the upper surface of the bottom beam of the vertical reaction frame, where at this time, the sample bearing lifting walking beam is in the lower limit position.

Step II: transporting a prepared ultra-large physical model sample to the entering and exiting opening for the ultra-large physical model sample in the crotch part between the high-strength reinforced concrete support piers by the heavy-load RGV track flatcar, and then moving the ultra-large physical model sample to the upper surface of the sample bearing lifting walking beam in the manner of horizontal push-pull rigid chain.

Step III: starting the four lifting cylinders once again, to enable the cylinder rods of the four lifting cylinders to retract synchronously to drive the sample bearing lifting walking beam to ascend at a uniform speed, where the ultra-large physical model sample ascends synchronously along with the sample bearing lifting walking beam, monitoring the operating posture and stability of the piston of the lifting cylinder and the sample bearing lifting walking beam in real time by the composite deformation sensors and the displacement-pressure-temperature sensors, and ensuring mounting safety of the ultra-large physical model sample in real time by the anti-falling locking device, until the ultra-large physical model sample enters the center of the horizontal reaction frame, where at this time, the sample bearing lifting walking beam is in an upper limit position.

Step IV: moving the reaction support pad beam in the reaction support pad beam entering and exiting tunnel to the upper surface of the bottom beam of the vertical reaction frame from the heavy-load track, then lowering the sample bearing lifting walking beam, and eliminating a gap between a lower surface of the sample bearing lifting walking beam and the reaction support pad beam to enable the sample bearing lifting walking beam to be in full contact with the reaction support pad beam, so that at this time, the ultra-large physical model sample is fully sealed in the ultra-large bottom opening and closing type three-dimensional loading apparatus.

Step V: performing a loading test on the ultra-large physical model sample therein by the ultra-large bottom opening and closing type three-dimensional loading apparatus, and monitoring the stress-strain information, the vibration information and the position information of the vertical reaction frame, the horizontal reaction frame and the lifting cylinder in real time by the composite deformation sensors and the displacement-pressure-temperature sensors, so that the ultra-large bottom opening and closing type three-dimensional loading apparatus operates healthily.

Step VI: after the loading test is completed, firstly raising the sample bearing lifting walking beam, recovering the gap between the lower surface of the sample bearing lifting walking beam and the reaction support pad beam, then moving the reaction support pad beam to the heavy-load track in the reaction support pad beam entering and exiting tunnel from the upper surface of the bottom beam of the vertical reaction frame, then driving the sample bearing lifting walking beam to descend by the four lifting cylinders, so that the sample bearing lifting walking beam falls to the upper surface of the bottom beam of the vertical reaction frame, the ultra-large physical model sample descends synchronously along with the sample bearing lifting walking beam, then the ultra-large physical model sample is moved to the heavy-load RGV track flatcar, and finally, the ultra-large physical model sample is transported to a finished product region by the heavy-load RGV track flatcar.

The present invention has the following beneficial effects.

The present invention provides an ultra-large bottom opening and closing type three-dimensional loading apparatus and a test method, which are suitable for automatic entering and exiting of physical model samples of 5 m level and larger, can achieve ultra-high stiffness and high reliability of a loading frame, and facilitate entering and exiting of the physical model samples. The ultra-large bottom opening and closing type three-dimensional loading apparatus consists of a horizontal reaction frame, a vertical reaction frame, a sample loading lifting mechanism, a reaction support pad beam, etc. During tests, a test reaction force is directly borne, thereby ensuring stability and operation accuracy of equipment under ultra-high load and long-term loading. Lifting for mounting and disassembly of the physical model samples are completed by a bearing lifting walking beam under the action of a hydraulic servo control lifting cylinder, the lifting beam serves as both entering and exiting platforms for the ultra-large physical model samples and a lifting platform for maintenance and disassembly of the actuators. The hydraulic servo control lifting cylinder has redundant design and high synchronous lifting accuracy, avoiding lifting safety risks caused by inconsistent actions of the lifting cylinder. In a physical simulation test of deep engineering disasters, a buffering damping technology for an ultra-large three-beam four-column pre-stressed loading frame is provided for the problem that the ultra-large physical model sample impacts test reliability of the loading frame during instantaneous failure. By setting back pressure of the lifting cylinder, the effect of the buffering cylinder can be achieved by the ultra-large physical model sample during the instantaneous failure, impact energy is rapidly absorbed within a short time, and the reliability of a test course, and the integrity and continuity of the test data are guaranteed. The present invention provides a health monitoring sensor system based on a combination of big data and simulation failure assessment, which can collect parameters such as stress-strain, vibration, positions, and temperature of the equipment in real time, and achieve health assessment, failure prediction, and maintenance decision-making of a loading structure.

In drawings, 1: horizontal reaction frame; 2: vertical reaction frame; 3: sample bearing lifting walking beam; 4: lifting cylinder; 5: reaction support pad beam; 6: array type actuator group; 7: linear array dynamic actuator group; 8: high-strength reinforced concrete support pier; 9: ultra-large physical model sample; 10: fan-shaped beam; 11: fan-shaped perforated beam; 12: arc-shaped support beam; 13: frame bearing base; 14: lifting cylinder through hole; 15: robot excavation entering and exiting channel; 16: double-layer steel wire winding layer; 17: top beam; 18: bottom beam; 19: hollow stand column; 20: pre-stressed tension rod; 21: adapter ear of cylinder barrel of lifting cylinder; 22: adapter ear of cylinder rod of lifting cylinder; 23: actuator mounting groove; 24: reaction support pad beam entering and exiting tunnel; 25: heavy-load RGV track flatcar; 26: composite deformation sensor.

DETAILED DESCRIPTION OF THE PREFERRED EMBODIMENT

The present invention will be further described in detail below in conjunction with the accompanying drawings and the specific embodiments.

Figure 1:
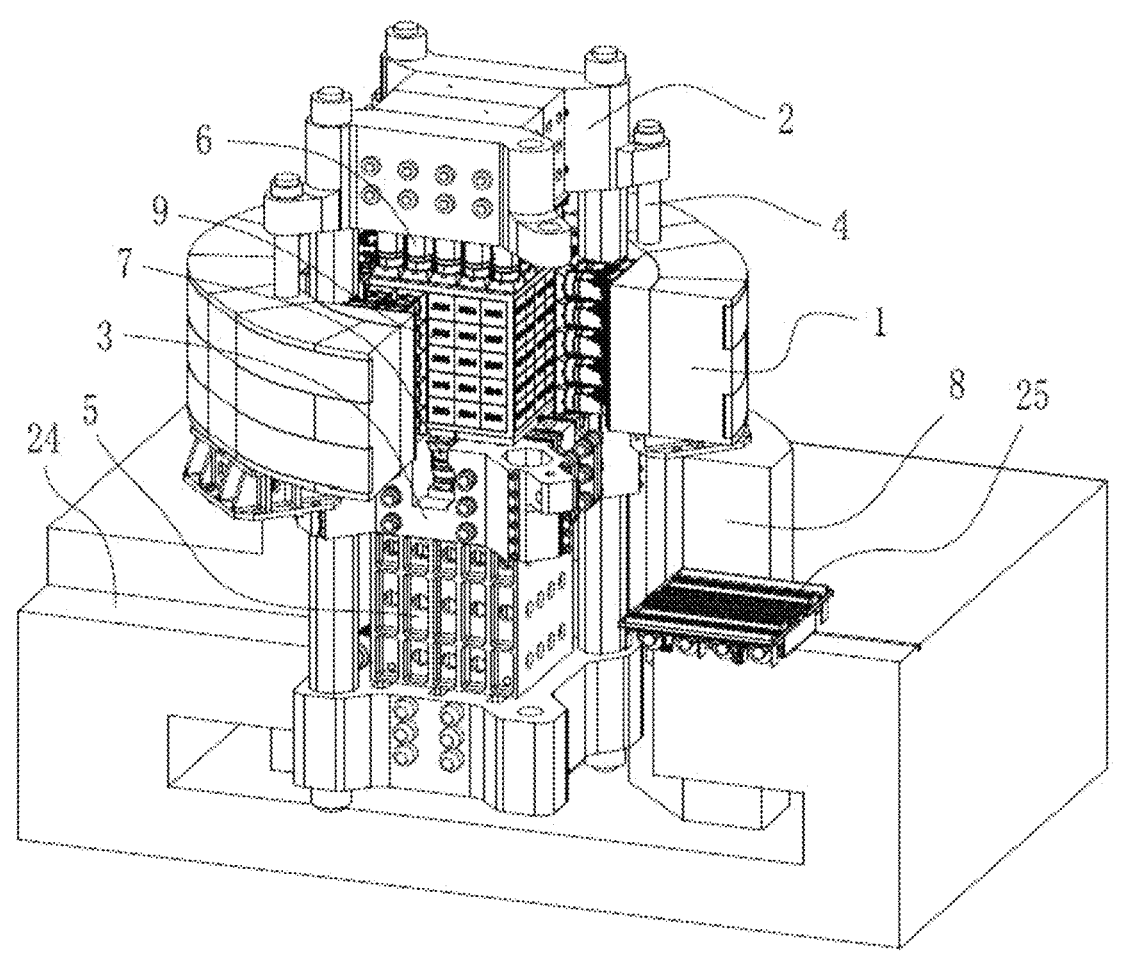
FIG. 1 is a partial sectional schematic view of an ultra-large bottom opening and closing type three-dimensional loading apparatus of the present invention.
Figure 2:
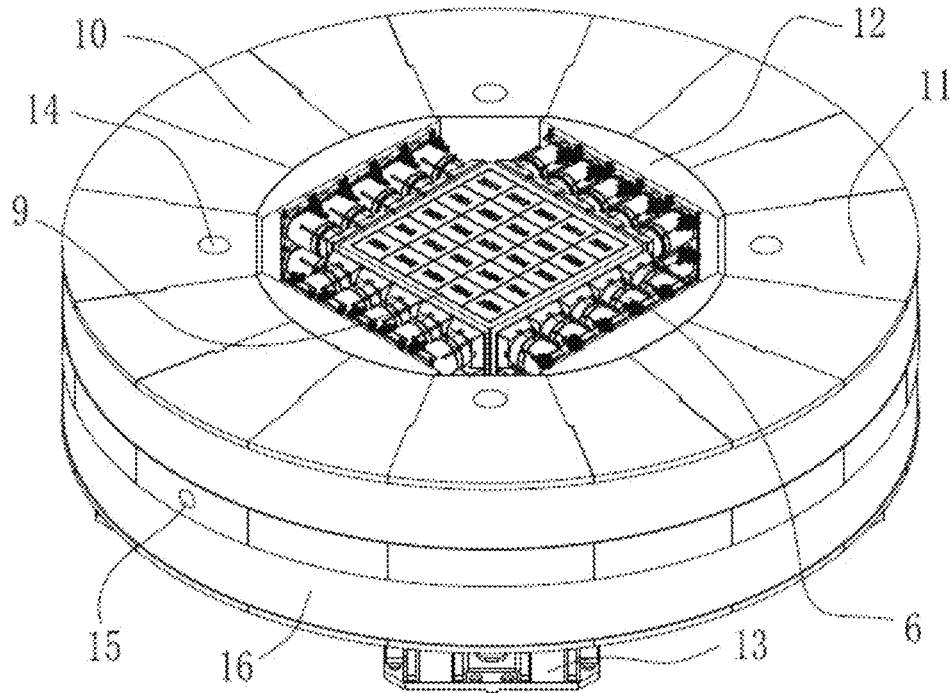
FIG. 2 is a schematic view of an assembly structure of a horizontal reaction frame, an array type actuator group, and an ultra-large physical model sample of the present invention.
Figure 3:
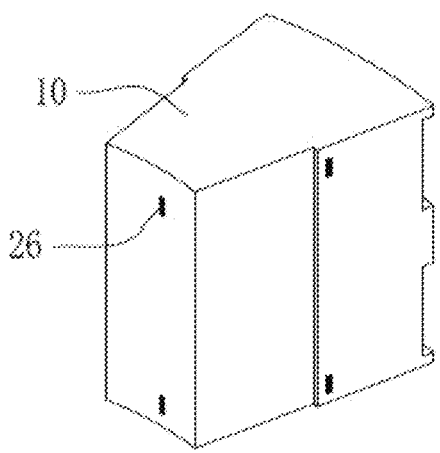
FIG. 3 is a schematic structural view of a fan-shaped beam with a composite deformation sensor of the present invention.
Figure 4:
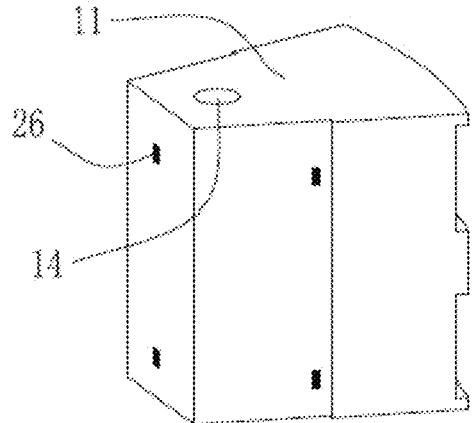
FIG. 4 is a schematic structural view of a fan-shaped perforated beam with the composite deformation sensor of the present invention.
Figure 5:
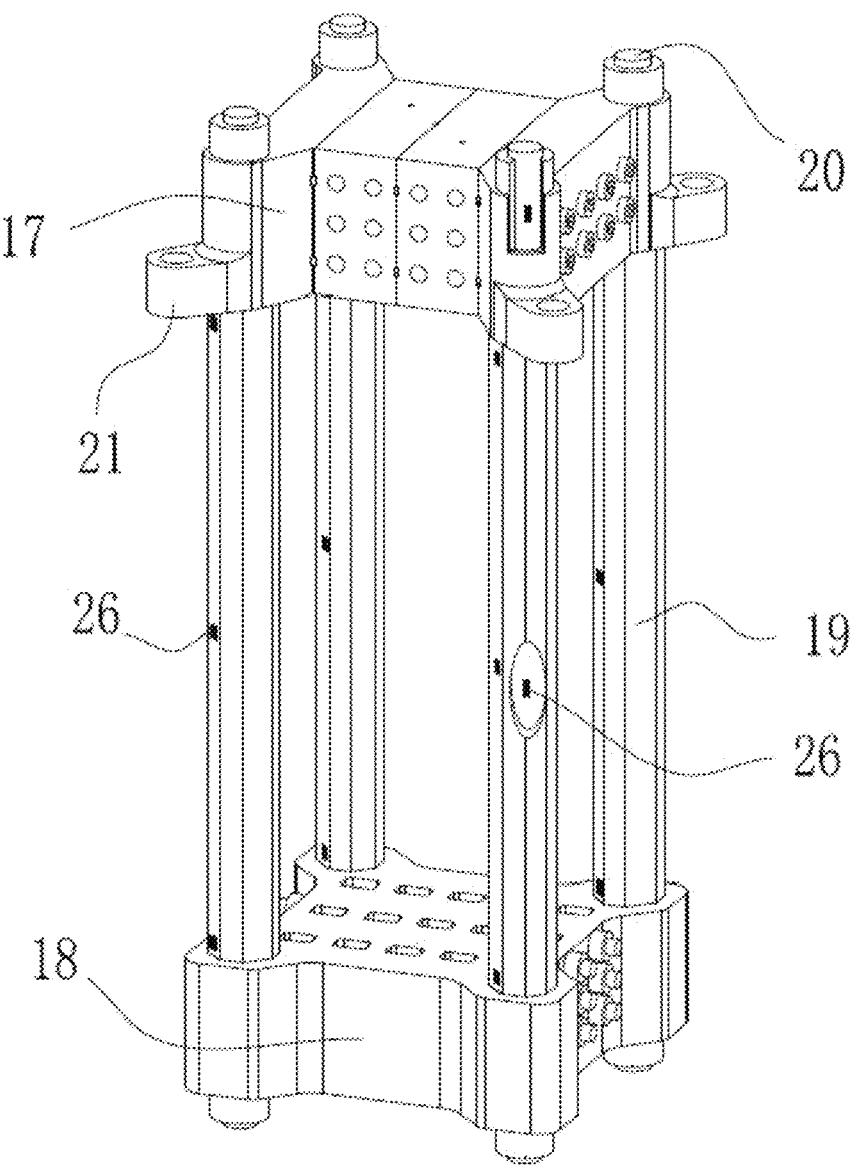
FIG. 5 is a partial sectional schematic view of a vertical reaction frame of the present invention.
Figure 6:
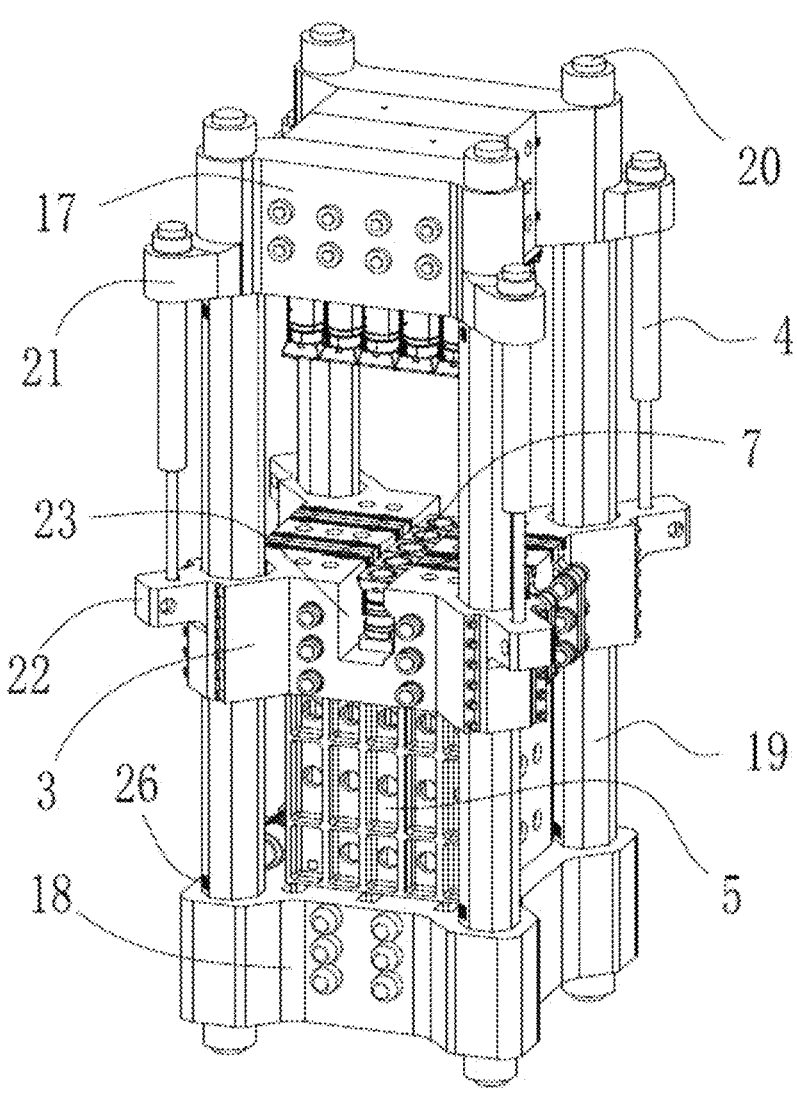
FIG. 6 is a schematic view of an assembly structure of the vertical reaction frame, a lifting cylinder, a sample bearing lifting walking beam, and a reaction support pad beam of the present invention.
Figure 7:
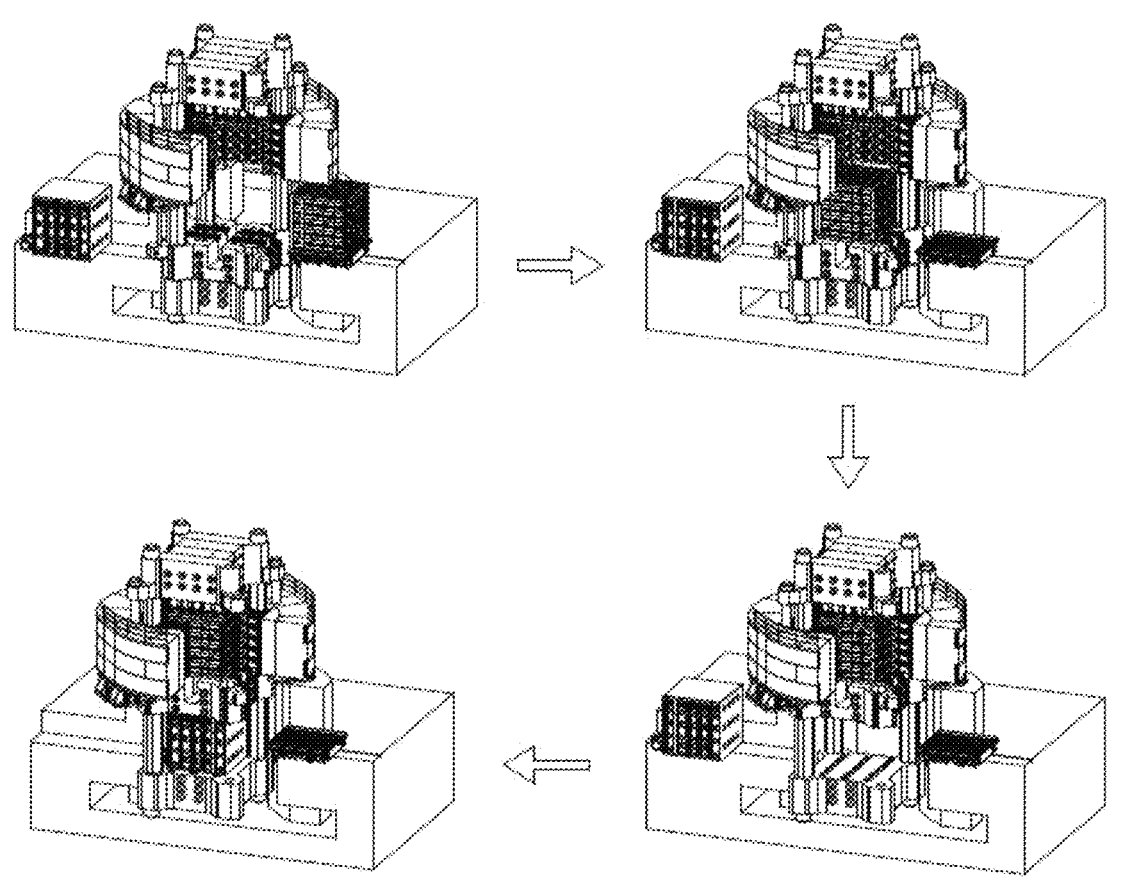
FIG. 7 is a schematic view of a mounting process of the ultra-large physical model sample of the ultra-large bottom opening and closing type three-dimensional loading apparatus of the present invention.

As shown in FIGS. 1-7, an ultra-large bottom opening and closing type three-dimensional loading apparatus includes a horizontal reaction frame 1, a vertical reaction frame 2, a sample bearing lifting walking beam 3, lifting cylinders 4, a reaction support pad beam 5, array type actuator groups 6, and a linear array dynamic actuator group 7, wherein the horizontal reaction frame 1 adopts a ring scarf structure, and is mounted on four high-strength reinforced concrete support piers 8; a height of each high-strength reinforced concrete support pier 8 is higher than that of an ultra-large physical model sample 9, and a bottom of the high-strength reinforced concrete support pier 8 is the same in elevation as a ground floor; a vertical central axis of the vertical reaction frame 2 coincides with that of the horizontal reaction frame 1, a lower end of the vertical reaction frame 2 is locally located in a foundation pit, and the lower end of the vertical reaction frame 2 is fixed to a bottom of the foundation pit through anchor bolts; the sample bearing lifting walking beam 3 is mounted at a middle of the vertical reaction frame 2 and located below a lower surface of the horizontal reaction frame 1; the sample bearing lifting walking beam 3 is connected to four corners at a top of the vertical reaction frame 2 through four lifting cylinders 4; one array type actuator group 6 is arranged on a lower surface of the top of the vertical reaction frame 2; four array type actuator groups 6 are uniformly distributed on an inner side of the horizontal reaction frame 1 along a circumference direction; a through type actuator is arranged in one of the four array type actuator groups 6, and a robot excavation entering and exiting channel 15 is disposed in the horizontal reaction frame 1 directly opposite to a through hole of the through type actuator; one linear array dynamic actuator group 7 is arranged at an upper part of the sample bearing lifting walking beam 3; and an entering and exiting opening for the ultra-large physical model sample 9 and an entering and exiting opening for the reaction support pad beam 5 are respectively formed in a crotch part between the high-strength reinforced concrete support piers 8 below the horizontal reaction frame 1.

In the embodiment, the ultra-large physical model sample 9 is made using a 3D printing technology, and printing materials with specific similar ratios can be prepared according to working conditions. The ultra-large physical model sample 9 is a cube with a size of 5 m×5 m×5 m (with a side length of 5 m). A geometric center of the ultra-large physical model sample 9 is defined as an origin of a coordinate system, and six surfaces of the ultra-large physical model sample 9 are defined as XR, XL, YF, YB, ZU, and ZD, respectively. Each surface is further divided into 25 independent loading unit surfaces. The depth of a foundation pit below an inner side of the high-strength reinforced concrete support pier 8 is −9 m. Anchor bolts are used to fix the vertical reaction frame 2 to a bottom of the foundation pit, thereby ensuring that the vertical reaction frame 2 has good anti-overturning performance. 25 single actuators are arranged in the array type actuator group 6, and the 25 single actuators adopt 5×5 array layout; and 5 single actuators are arranged in the linear array dynamic actuator group 7, and the 5 single actuators adopt 1×5 array layout.

The horizontal reaction frame 1 adopts a longitudinal multi-group single-beam circumferential T-shaped scarf assembly structure, and includes fan-shaped beams 10, fan-shaped perforated beams 11, arc-shaped support beams 12, and frame bearing bases 13; four fan-shaped perforated beams 11 are uniformly distributed along the circumference direction of the horizontal reaction frame 1, the fan-shaped beams 10 are scarfed between two adjacent fan-shaped perforated beams 11 to form a ring assembly body, and a double-layer steel wire winding layer 16 is arranged on an outer side of the ring assembly body; scarf contact surfaces of the fan-shaped beams 10 and the fan-shaped perforated beams 11 all adopt a T-shaped engaging self-limiting structure; the structure can ensure that the adjacent fan-shaped beams 10 are more tightly scarfed under loading, thereby reducing deformation of the horizontal reaction frame 1; a lifting cylinder through hole 14 is formed in each fan-shaped perforated beam 11, the frame bearing base 13 is fixedly arranged below each fan-shaped perforated beam 11, and the frame bearing base 13 is connected to the high-strength reinforced concrete support pier 8 through a high-bearing shock absorber; the four arc-shaped support beams 12 are uniformly distributed on an inner side of the ring assembly body, an outer side arc surface of each arc-shaped support beam 12 is in contact with an inner side arc surface of the ring assembly body, and the array type actuator group 6 is arranged on an inner side plane of the arc-shaped support beam 12; and the robot excavation entering and exiting channel 15 is located on one fan-shaped beam 10 and the arc-shaped support beam 12 directly opposite to the fan-shaped beam 10.

In the embodiment, the overall stiffness of the horizontal reaction frame 1 is greater than 50 GN/m, and the horizontal reaction frame has good multi-directional bearing capacity. The robot excavation entering and exiting channel 15 is reserved in the fan-shaped beam 10 to simulate the excavation action of a deep engineering activity robot, the overall external dimension of the horizontal reaction frame 1 is φ 20 m×5.5 m (diameter×height), the double-layer steel wire winding layer 16 realizes pretension mounting of a winding robot, and a steel wire cross-section in the double-layer steel wire winding layer 16 is rectangular, with a cross-sectional size of 1.5 mm×5 mm, and the material of the steel wire is 65 Mn.

The vertical reaction frame 2 includes a top beam 17, a bottom beam 18, hollow stand columns 19 and pre-stressed tension rods 20, wherein the pre-stressed tension rod 20 adopts an integral forging structure; the top beam 17 adopts a rectangular structure, and adapter ears 21 of cylinder barrels of the lifting cylinders are arranged at four corners of the top beam 17; ends of the cylinder barrels of the lifting cylinders 4 are fixedly connected to the adapter ears 21 of the cylinder barrels of the lifting cylinders; the bottom beam 18 adopts a rectangular structure, and is located directly below the top beam 17; four hollow stand columns 19 are arranged between four corners of the bottom beam 18 and the four corners of the top beam 17, and one pre-stressed tension rod 20 is mounted in each hollow stand column 19; a top end of the pre-stressed tension rod 20 is fixed to the top beam 17 through a nut, and a bottom end of the pre-stressed tension rod 20 is fixed to the bottom beam 18 through a nut; and the array type actuator group 6 is arranged on a lower surface of the top beam 17.

In the embodiment, the overall stiffness of the vertical reaction frame 2 is greater than 25 GN/m. The top beam 17 and the bottom beam 18 can be assembled in a combination structure and pre-tightened and fixed by the pre-stressed tension rod 20. The pre-stressed tension rod 20 is forged with 42CrMo high-strength steel, with a tensile strength of 1600 MPa and a compressive strength of 930 MPa.

The sample bearing lifting walking beam 3 adopts a rectangular structure, and the adapter ears 22 of cylinder rods of the lifting cylinders are arranged at four corners of the sample bearing lifting walking beam 3; ends of the cylinder rods of the lifting cylinders 4 are fixedly connected to the adapter ears 22 of the cylinder rods of the lifting cylinders; a hollow stand column through guide hole is formed in an inner side of each adapter ear 22 of the cylinder rod of the lifting cylinder, and the hollow stand column 19 penetrates through the hollow stand column through guide hole; an actuator mounting groove 23 is formed in a middle of the sample bearing lifting walking beam 3, the linear array dynamic actuator group 7 is arranged in the actuator mounting groove 23, and a single actuator in the linear array dynamic actuator group adopts a dynamic disturbance hydraulic actuator 7; a friction reducing support roller group is arranged on an upper surface of the sample bearing lifting walking beam 3; when the sample bearing lifting walking beam 3 is located on the bottom beam 18 of the vertical reaction frame 2, the ultra-large physical model sample 9 is delivered to the sample bearing lifting walking beam 3 in the manner of horizontal push-pull rigid chain through the heavy-load RGV track flatcar 25; and after the sample bearing lifting walking beam 3 bears the ultra-large physical model sample 9, the sample bearing lifting walking beam 3 is lifted to a sample loading station in a center of the horizontal reaction frame 1 by the four lifting cylinders 4, to complete opening and closing type action of the three-dimensional loading apparatus for the ultra-large physical model sample 9.

Specifically, with the help of a closed-loop displacement control of the high-precision displacement sensors, height positions of the sample bearing lifting walking beam 3 and the ultra-large physical model sample 9 thereon can be accurately positioned, when the array type actuator group 6 on the vertical reaction frame 2 suddenly loses load, a pressure of hydraulic oil in the lifting cylinder 4 is instantaneously increased, and a damping will be generated through a throttle valve and an overflow valve, and finally discharged into the accumulator. Back pressure of the lifting cylinder cooperates with the damping generated by the throttle valve and the overflow valve, which can reduce the vibration of the loading frame under impact load, thereby ensuring the stability of the loading frame under instantaneous loss of load and vibration impact test conditions.

Specifically, the array type actuator group 6 is designated as a first 5×5 array type static hydraulic actuator group, a second 5×5 array type static hydraulic actuator group, and a third 5×5 array type static hydraulic actuator group according to different mounting positions. Three first 5×5 array static hydraulic actuator groups are arranged and mounted on three arc-shaped support beams 12 in the horizontal reaction frame 1. One second 5×5 array static hydraulic actuator group is arranged and mounted on the arc-shaped support beam 12 of the robot excavation entering and exiting channel 15 arranged in the horizontal reaction frame 1, and the through type actuator is arranged in the second 5×5 array static hydraulic actuator group. The third 5×5 array static hydraulic actuator group is mounted on the lower surface of the top beam 17 of the vertical reaction frame 2. A plurality of through type actuators are also arranged in the third 5×5 array static hydraulic actuator group to establish a vertical deep engineering test channel.

The lifting cylinder 4 adopts a proportional closed-loop displacement control technology, and a high-precision displacement sensor is arranged between the cylinder rod and the cylinder barrel of the lifting cylinder 4; a hydraulic chamber inside the lifting cylinder 4 is connected to an accumulator through a throttle valve and an overflow valve sequentially; and an anti-falling locking device is mounted between the hollow stand column 19 and the sample bearing lifting walking beam 3 and includes an anti-falling high-strength rack and an anti-falling locking cylinder, the anti-falling high-strength rack is vertically and fixedly arranged on an outer surface of the hollow stand column 19, the anti-falling locking cylinder is horizontally and fixedly arranged on the sample bearing lifting walking beam 3, an anti-falling pad is mounted at an end of a cylinder rod of the anti-falling locking cylinder, and the anti-falling pad and the anti-falling high-strength rack are in engaged and locked cooperation.

Specifically, at the moment when the sample bearing lifting walking beam 3 accidentally falls, the cylinder rod of the anti-falling locking cylinder rapidly extends out, allowing the anti-falling pad at the end of the cylinder rod to be rapidly engaged with the anti-falling high-strength rack on the outer surface of the hollow stand column 19, further locking of the sample bearing lifting walking beam 3 is realized by engaging the anti-falling pad and the anti-falling high-strength rack, and the sample bearing lifting walking beam 3 is prevented from falling down, thereby guaranteeing safety of devices and personnel.

The reaction support pad beam entering and exiting tunnel 24 is arranged on a ground of an outer side of the entering and exiting opening for the reaction support pad beam 5 in the high-strength reinforced concrete support pier 8, the heavy-load track is arranged in the reaction support pad beam entering and exiting tunnel 24, and an upper surface of the heavy-load track is flush with an upper surface of the bottom beam 18 of the vertical reaction frame 2; and the reaction support pad beam 5 adopts the servo motor as a driving actuator.

In the embodiment, the movement accuracy of the reaction support pad beam 5 along the heavy-load track is ±2 mm.

The heavy-load RGV track flatcar 25 is arranged on a ground of an outer side of the entering and exiting opening for the ultra-large physical model sample 9 in the high-strength reinforced concrete support pier 8, the ultra-large physical model sample 9 proceeds with a station conversion through the heavy-load RGV track flatcar 25, the heavy-load RGV track flatcar 25 adopts a low-voltage track power supply mode, and the heavy-load RGV track flatcar 25 adopts the manner of horizontal push-pull rigid chain to move the ultra-large physical model sample 9; when the sample bearing lifting walking beam 3 is located in a lower limit position, an upper surface of the heavy-load RGV track flatcar 25 is flush with the upper surface of the sample bearing lifting walking beam 3; and a friction reducing support roller group is arranged on the upper surface of the heavy-load RGV track flatcar 25.

In the embodiment, a load-bearing capacity of the heavy-load RGV track flatcar 25 is 400 t, which can meet transportation needs of the ultra-large physical model sample 9 of 5 m level. The accuracy of travelling, positioning, and parking positions is ±1 mm.

A health monitoring sensor system is arranged on the vertical reaction frame 2, the horizontal reaction frame 1, and the lifting cylinders 4, and includes composite deformation sensors 26 and displacement-pressure-temperature sensors; the composite deformation sensors 26 are respectively arranged at an upper end, a middle, and a lower end of each pre-stressed tension rod 20, and twelve composite deformation sensors 26 in total are arranged on the four pre-stressed tension rods 20; the composite deformation sensors 26 are respectively arranged at an upper end, a middle, and a lower end of an outer side of each hollow stand column 19, and twelve composite deformation sensors 26 in total are arranged on the four hollow stand columns 19; the composite deformation sensors 26 are respectively arranged on an inner side of the fan-shaped beams 10 and the fan-shaped perforated beams 11 of the horizontal reaction frame 1, as well as an upper end and a lower end of the scarf surfaces, and thirty-two composite deformation sensors 26 in total are arranged on the horizontal reaction frame 1; stress-strain information, vibration information, and position information of the ultra-large bottom opening and closing type three-dimensional loading apparatus in testing operation are monitored by using the composite deformation sensors 26; and the displacement-pressure-temperature sensor is mounted on the lifting cylinder 4 to monitor operating posture and stability of the lifting cylinder.

A test method adopting the ultra-large bottom opening and closing type three-dimensional loading apparatus includes the following steps.

Step I: starting the four lifting cylinders 4 synchronously, to enable the cylinder rods of the four lifting cylinders 4 to extend downwards synchronously to drive the sample bearing lifting walking beam 3 to descend at a uniform speed, and monitoring the operating posture and stability of a piston of the lifting cylinders 4 and the sample bearing lifting walking beam 3 in real time by the composite deformation sensors 26 and the displacement-pressure-temperature sensors, until the sample bearing lifting walking beam 3 falls to the upper surface of the bottom beam 18 of the vertical reaction frame 2, where at this time, the sample bearing lifting walking beam 3 is in the lower limit position.

Step II: transporting a prepared ultra-large physical model sample 9 to the entering and exiting opening for the ultra-large physical model sample 9 between the high-strength reinforced concrete support piers 8 by the heavy-load RGV track flatcar 25, and then moving the ultra-large physical model sample 9 to the upper surface of the sample bearing lifting walking beam 3 in the manner of horizontal push-pull rigid chain.

Step III: starting the four lifting cylinders 4 once again, to enable the cylinder rods of the four lifting cylinders 4 to retract synchronously to drive the sample bearing lifting walking beam 3 to ascend at a uniform speed, where the ultra-large physical model sample 9 ascends synchronously along with the sample bearing lifting walking beam 3, monitoring the operating posture and stability of the piston of the lifting cylinder 4 and the sample bearing lifting walking beam 3 in real time by the composite deformation sensors 26 and the displacement-pressure-temperature sensors, and ensuring mounting safety of the ultra-large physical model sample 9 in real time by the anti-falling locking device, until the ultra-large physical model sample 9 enters the center of the horizontal reaction frame 1, where at this time, the sample bearing lifting walking beam 3 is in an upper limit position.

Step IV: moving the reaction support pad beam 5 in the reaction support pad beam entering and exiting tunnel 24 to the upper surface of the bottom beam 18 of the vertical reaction frame 2 from the heavy-load track, then lowering the sample bearing lifting walking beam 3, and eliminating a gap between a lower surface of the sample bearing lifting walking beam 3 and the reaction support pad beam 5 to enable the sample bearing lifting walking beam 3 to be in full contact with the reaction support pad beam 5, so that at this time, the ultra-large physical model sample 9 is fully sealed in the ultra-large bottom opening and closing type three-dimensional loading apparatus.

Step V: performing a loading test on the ultra-large physical model sample 9 therein by the ultra-large bottom opening and closing type three-dimensional loading apparatus, and monitoring the stress-strain information, the vibration information and the position information of the vertical reaction frame 2, the horizontal reaction frame 1 and the lifting cylinder 4 in real time by the composite deformation sensors 26 and the displacement-pressure-temperature sensors, so that the ultra-large bottom opening and closing type three-dimensional loading apparatus operates healthily.

Step VI: after the loading test is completed, firstly raising the sample bearing lifting walking beam 3, recovering the gap between the lower surface of the sample bearing lifting walking beam 3 and the reaction support pad beam 5, then moving the reaction support pad beam 5 to the heavy-load track in the reaction support pad beam entering and exiting tunnel 24 from the upper surface of the bottom beam 18 of the vertical reaction frame 2, then driving the sample bearing lifting walking beam 3 to descend by the four lifting cylinders 4, so that the sample bearing lifting walking beam 3 falls to the upper surface of the bottom beam 18 of the vertical reaction frame 2, the ultra-large physical model sample 9 descends synchronously along with the sample bearing lifting walking beam 3, then the ultra-large physical model sample 9 is moved to the heavy-load RGV track flatcar 25, and finally, the ultra-large physical model sample 9 is transported to a finished product region by the heavy-load RGV track flatcar 25.

The solutions in the embodiments are not intended to limit the scope of patent protection of the present invention. Any equivalent implementation or modification that does not deviate from the present invention is included in the scope of the patent in this case.

What is claimed is:

1. An ultra-large bottom opening and closing type three-dimensional loading apparatus, comprising: a horizontal reaction frame, a vertical reaction frame, a sample bearing lifting walking beam, four lifting cylinders, a reaction support pad beam, array type actuator groups, and a linear array dynamic actuator group, wherein the horizontal reaction frame adopts a ring scarf structure, and is mounted on four high-strength reinforced concrete support piers; a height of each high-strength reinforced concrete support pier is higher than that of an ultra-large physical model sample, and a bottom of the high-strength reinforced concrete support pier is the same in elevation as a ground floor; a vertical central axis of the vertical reaction frame coincides with that of the horizontal reaction frame, a lower end of the vertical reaction frame is locally located in a foundation pit, and the lower end of the vertical reaction frame is fixed to a bottom of the foundation pit through anchor bolts; the sample bearing lifting walking beam is mounted at a middle of the vertical reaction frame and located below a lower surface of the horizontal reaction frame; the sample bearing lifting walking beam is connected to four corners at a top of the vertical reaction frame through the four lifting cylinders; one array type actuator group is arranged on a lower surface of the top of the vertical reaction frame; four array type actuator groups are uniformly distributed on an inner side of the horizontal reaction frame along a circumference direction; a through type actuator is arranged in one of the four array type actuator groups, and a robot excavation entering and exiting channel is disposed in the horizontal reaction frame directly opposite to a through hole of the through type actuator; one linear array dynamic actuator group is arranged at an upper part of the sample bearing lifting walking beam; and an entering and exiting opening for the ultra-large physical model sample and an entering and exiting opening for the reaction support pad beam are respectively formed in a crotch part between the high-strength reinforced concrete support piers below the horizontal reaction frame.

2. The ultra-large bottom opening and closing type three-dimensional loading apparatus according to claim 1, wherein the horizontal reaction frame adopts a longitudinal multi-group single-beam circumferential T-shaped scarf assembly structure, and comprises fan-shaped beams, four fan-shaped perforated beams, four arc-shaped support beams, and a frame bearing base; the four fan-shaped perforated beams are uniformly distributed along the circumference direction of the horizontal reaction frame, the fan-shaped beams are scarfed between two adjacent fan-shaped perforated beams to form a ring assembly body, and a double-layer steel wire winding layer is arranged on an outer side of the ring assembly body; scarf contact surfaces of the fan-shaped beams and the fan-shaped perforated beams all adopt a T-shaped engaging self-limiting structure; a lifting cylinder through hole is formed in each fan-shaped perforated beam, the frame bearing base is fixedly arranged below each fan-shaped perforated beam, and the frame bearing base is connected to the high-strength reinforced concrete support pier through a high-bearing shock absorber; the four arc-shaped support beams are uniformly distributed on an inner side of the ring assembly body, an outer side arc surface of each arc-shaped support beam is in contact with an inner side arc surface of the ring assembly body, and one of the array type actuator groups is arranged on an inner side plane of the arc-shaped support beam; and the robot excavation entering and exiting channel is located on one fan-shaped beam and the arc-shaped support beam directly opposite to the one fan-shaped beam.

3. The ultra-large bottom opening and closing type three-dimensional loading apparatus according to claim 2, wherein the vertical reaction frame comprises a top beam, bottom beam, and four pre-stressed tension rods; the pre-stressed tension rods adopt an integral forging structure; the top beam adopts a rectangular structure, and adapter ears of cylinder barrels of the lifting cylinders are arranged at four corners of the top beam; ends of the cylinder barrels of the lifting cylinders are fixedly connected to the adapter ears of the cylinder barrels of the lifting cylinders; the bottom beam adopts a rectangular structure, and is located directly below the top beam; four hollow stand columns are arranged between four corners of the bottom beam and the four corners of the top beam, and one pre-stressed tension rod is mounted in each hollow stand column; a top end of each pre-stressed tension rod is fixed to the top beam through first nuts, and a bottom end of each pre-stressed tension rod is fixed to the bottom beam through second nuts; and one of the array type actuator groups is arranged on a lower surface of the top beam.

4. The ultra-large bottom opening and closing type three-dimensional loading apparatus according to claim 3, wherein the sample bearing lifting walking beam adopts a rectangular structure, and adapter ears of cylinder rods of the lifting cylinders are arranged at four corners of the sample bearing lifting walking beam; ends of the cylinder rods of the lifting cylinders are fixedly connected to the adapter ears of the cylinder rods of the lifting cylinders; a hollow stand column through guide hole is formed in an inner side of each adapter ear of the cylinder rod of the lifting cylinder, and each hollow stand column penetrates through each hollow stand column through guide hole; an actuator mounting groove is formed in a middle of the sample bearing lifting walking beam, the linear array dynamic actuator group is arranged in the actuator mounting groove, and a single actuator in the linear array dynamic actuator group adopts a dynamic disturbance hydraulic actuator; a friction reducing support roller group is arranged on an upper surface of the sample bearing lifting walking beam; when the sample bearing lifting walking beam is located on the bottom beam of the vertical reaction frame, the ultra-large physical model sample is delivered to the sample bearing lifting walking beam in a manner of horizontal push-pull rigid chain through a heavy-load RGV track flatcar; and after the sample bearing lifting walking beam bears the ultra-large physical model sample, the sample bearing lifting walking beam is lifted to a sample loading station in a center of the horizontal reaction frame by the four lifting cylinders, to complete opening and closing type action of the three-dimensional loading apparatus for the ultra-large physical model sample.

5. The ultra-large bottom opening and closing type three-dimensional loading apparatus according to claim 4, wherein each lifting cylinder adopts a proportional closed-loop displacement control technology, and a high-precision displacement sensor is arranged between the cylinder rod and the cylinder barrel of each lifting cylinder; a hydraulic chamber inside each lifting cylinder is connected to an accumulator through a throttle valve and an overflow valve sequentially; and an anti-falling locking device is mounted between each hollow stand column, and the sample bearing lifting walking beam, and comprises an anti-falling high-strength rack and an anti-falling locking cylinder, the anti-falling high-strength rack is vertically and fixedly arranged on an outer surface of each hollow stand column, the anti-falling locking cylinder is horizontally and fixedly arranged on the sample bearing lifting walking beam, an anti-falling pad is mounted at an end of a cylinder rod of the anti-falling locking cylinder, and the anti-falling pad and the anti-falling high-strength rack are in engaged and locked cooperation.

6. The ultra-large bottom opening and closing type three-dimensional loading apparatus according to claim 5, wherein a reaction support pad beam entering and exiting tunnel is arranged on a ground of an outer side of the entering and exiting opening for the reaction support pad beam in the high-strength reinforced concrete support pier, a heavy-load track is arranged in the reaction support pad beam entering and exiting tunnel, and an upper surface of the heavy-load track is flush with an upper surface of the bottom beam of the vertical reaction frame; and the reaction support pad beam adopts a servo motor as a driving actuator.

7. The ultra-large bottom opening and closing type three-dimensional loading apparatus according to claim 6, wherein the heavy-load RGV track flatcar is arranged on a ground of an outer side of the entering and exiting opening for the ultra-large physical model sample in the high-strength reinforced concrete support pier, the ultra-large physical model sample proceeds with a station conversion through the heavy-load RGV track flatcar, the heavy-load RGV track flatcar adopts a low-voltage track power supply mode, and the heavy-load RGV track flatcar adopts the manner of horizontal push-pull rigid chain to move the ultra-large physical model sample; when the sample bearing lifting walking beam is located in a lower limit position, an upper surface of the heavy-load RGV track flatcar is flush with the upper surface of the sample bearing lifting walking beam; and a friction reducing support roller group is arranged on the upper surface of the heavy-load RGV track flatcar.

8. The ultra-large bottom opening and closing type three-dimensional loading apparatus according to claim 7, wherein a health monitoring sensor system is arranged on the vertical reaction frame, the horizontal reaction frame, and the lifting cylinders, and comprises composite deformation sensors and displacement-pressure-temperature sensors; the composite deformation sensors are respectively arranged at an upper end, a middle, and a lower end of each pre-stressed tension rod, and twelve composite deformation sensors in total are arranged on the four pre-stressed tension rods; the composite deformation sensors are respectively arranged at an upper end, a middle, and a lower end of an outer side of each hollow stand column, and twelve composite deformation sensors in total are arranged on the four hollow stand columns; the composite deformation sensors are respectively arranged on an inner side of the fan-shaped beams and the fan-shaped perforated beams of the horizontal reaction frame, as well as an upper end and a lower end of the scarf contact surfaces, and thirty-two composite deformation sensors in total are arranged on the horizontal reaction frame; stress-strain information, vibration information, and position information of the ultra-large bottom opening and closing type three-dimensional loading apparatus in testing operation are monitored by using the composite deformation sensors; and the displacement-pressuretemperature sensors are mounted on each lifting cylinder to monitor operating posture and stability of the lifting cylinders.

9. A test method adopting the ultra-large bottom opening and closing type three-dimensional loading apparatus according to claim 8, comprising the following steps:

Step I: starting the four lifting cylinders synchronously, to enable the cylinder rods of the four lifting cylinders to extend downwards synchronously to drive the sample bearing lifting walking beam to descend at a uniform speed, and monitoring the operating posture and stability of a piston of the lifting cylinders and the sample bearing lifting walking beam in real time by the composite deformation sensors and the displacement-pressure-temperature sensors, until the sample bearing lifting walking beam falls to the upper surface of the bottom beam of the vertical reaction frame, wherein at this time, the sample bearing lifting walking beam is in the lower limit position;

Step II: transporting a prepared ultra-large physical model sample to the entering and exiting opening for the ultra-large physical model sample in the crotch part between the high-strength reinforced concrete support piers by the heavy-load RGV track flatcar, and then moving the ultra-large physical model sample to the upper surface of the sample bearing lifting walking beam in the manner of horizontal push-pull rigid chain;

Step III: starting the four lifting cylinders once again, to enable the cylinder rods of the four lifting cylinders to retract synchronously to drive the sample bearing lifting walking beam to ascend at a uniform speed, wherein the ultra-large physical model sample ascends synchronously along with the sample bearing lifting walking beam, monitoring the operating posture and stability of the piston of each lifting cylinder and the sample bearing lifting walking beam in real time by the composite deformation sensors and the displacement-pressure-temperature sensors, and ensuring mounting safety of the ultra-large physical model sample in real time by the anti-falling locking device, until the ultra-large physical model sample enters the center of the horizontal reaction frame, wherein at this time, the sample bearing lifting walking beam is in an upper limit position;

Step IV: moving the reaction support pad beam in the reaction support pad beam entering and exiting tunnel to the upper surface of the bottom beam of the vertical reaction frame from the heavy-load track, then lowering the sample bearing lifting walking beam, and eliminating a gap between a lower surface of the sample bearing lifting walking beam and the reaction support pad beam to enable the sample bearing lifting walking beam to be in full contact with the reaction support pad beam, so that at this time, the ultra-large physical model sample is fully sealed in the ultra-large bottom opening and closing type three-dimensional loading apparatus;

Step V: performing a loading test on the ultra-large physical model sample therein by the ultra-large bottom opening and closing type three-dimensional loading apparatus, and monitoring the stress-strain information, the vibration information and the position information of the vertical reaction frame, the horizontal reaction frame and each lifting cylinder in real time by the composite deformation sensors and the displacement-pressure-temperature sensors, so that the ultra-large bottom opening and closing type three-dimensional loading apparatus operates healthily; and Step VI: after the loading test is completed, firstly raising the sample bearing lifting walking beam, recovering the gap between the lower surface of the sample bearing lifting walking beam and the reaction support pad beam, then moving the reaction support pad beam to the heavy-load track in the reaction support pad beam entering and exiting tunnel from the upper surface of the bottom beam of the vertical reaction frame, then driving the sample bearing lifting walking beam to descend by the four lifting cylinders, so that the sample bearing lifting walking beam falls to the upper surface of the bottom beam of the vertical reaction frame, the ultra-large physical model sample descends synchronously along with the sample bearing lifting walking beam, then the ultra-large physical model sample is moved to the heavy-load RGV track flatcar, and finally, the ultra-large physical model sample is transported to a finished product region by the heavy-load RGV track flatcar.

* * * * *